(12) United States Patent
Jiang et al.

(10) Patent No.: US 10,816,973 B2
(45) Date of Patent: Oct. 27, 2020

(54) UTILIZING RULE-BASED AND MODEL-BASED DECISION SYSTEMS FOR AUTONOMOUS DRIVING CONTROL

(71) Applicant: Baidu USA LLC, Sunnyvale, CA (US)

(72) Inventors: Yifei Jiang, Sunnyvale, CA (US); Jiaming Tao, Sunnyvale, CA (US); Dong Li, Sunnyvale, CA (US); Jiangtao Hu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 64 days.

(21) Appl. No.: 15/612,205

(22) Filed: Jun. 2, 2017

(65) Prior Publication Data

US 2018/0348763 A1 Dec. 6, 2018

(51) Int. Cl.
*G05D 1/00* (2006.01)
*B60W 30/00* (2006.01)
*G06N 3/04* (2006.01)
*G06N 5/04* (2006.01)
*G06N 5/02* (2006.01)
*G06N 3/08* (2006.01)

(52) U.S. Cl.
CPC ......... *G05D 1/0088* (2013.01); *B60W 30/00* (2013.01); *G06N 3/0427* (2013.01); *G06N 3/08* (2013.01); *G06N 5/025* (2013.01); *G06N 5/046* (2013.01); *G05D 2201/0213* (2013.01)

(58) Field of Classification Search
None
See application file for complete search history.

(56) References Cited

U.S. PATENT DOCUMENTS

2017/0123419 A1* 5/2017 Levinson ............. G05D 1/0022
2017/0253241 A1* 9/2017 Filev ................ G08G 1/096741

* cited by examiner

*Primary Examiner* — Jonathan M Dager
*Assistant Examiner* — Garrett F Evans
(74) *Attorney, Agent, or Firm* — Womble Bond Dickinson (US) LLP (57) ABSTRACT

Described is a system (and method) for providing a flexible decision system for autonomous driving. The system may include a framework that allows a decision system to switch between a deliberate rule-based decision framework and an intuitive machine-learning model-based decision framework. The system may invoke the appropriate framework (or subsystem) based on a particular set of driving conditions or environment. Accordingly, the system described herein may provide an efficient and adaptable decision system for autonomous driving.

11 Claims, 6 Drawing Sheets

UTILIZING RULE-BASED AND MODEL-BASED DECISION SYSTEMS FOR AUTONOMOUS DRIVING CONTROL

TECHNICAL FIELD

Embodiments of the present disclosure relate generally to operating autonomous vehicles. More particularly, embodiments of the disclosure relate to an adaptable decision system for controlling the autonomous vehicle.

BACKGROUND

Vehicles operating in an autonomous mode (e.g. driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Controlling the vehicle based on a decision making process is a significant operation for an autonomous driving system. Decision making for an autonomous vehicle typically relies on a fixed set of rules that determine an appropriate course of action. Operation of a vehicle, however, often involves encountering various unpredictable driving scenarios and conditions. Accordingly, the fixed set of rules may not be sufficient when dealing with such situations. Moreover, in order to update or improve the set of rules, the system must wait until a software update or upgrade is available. Accordingly, a purely rule-based decision making system for autonomous driving vehicles often relies on a human driver as a fallback. Thus, there is a continued need for autonomous driving systems to provide an adaptable decision framework for various driving conditions.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Reference in the specification to "one embodiment" or "an embodiment" means that a particular feature, structure, or characteristic described in conjunction with the embodiment can be included in at least one embodiment of the disclosure. The appearances of the phrase "embodiment" in various places in the specification do not necessarily all refer to the same embodiment.

Described is a system (and method) for providing a flexible decision system for autonomous driving. The system may include a framework that allows a decision system to switch between a deliberate rule-based decision framework and an intuitive machine-learning model-based decision framework. Accordingly, the system may invoke the appropriate framework (or subsystem) based on a particular set of driving conditions or environment. Such a system provides several advantages such as reducing the computational resources required. For example, the system may invoke the intuitive model-based decision system, which requires less resources that a rule-based system, as a default system. In addition, by implementing a model-based approach such as a deep neural network (DNN), the decision system may learn and adapt. For example, data collected during the use of the deliberate rule-based decision framework may be used to train the model. Accordingly, the system described herein may provide an efficient and adaptable decision system for operating an autonomous driving vehicle (ADV).

Figure 1:
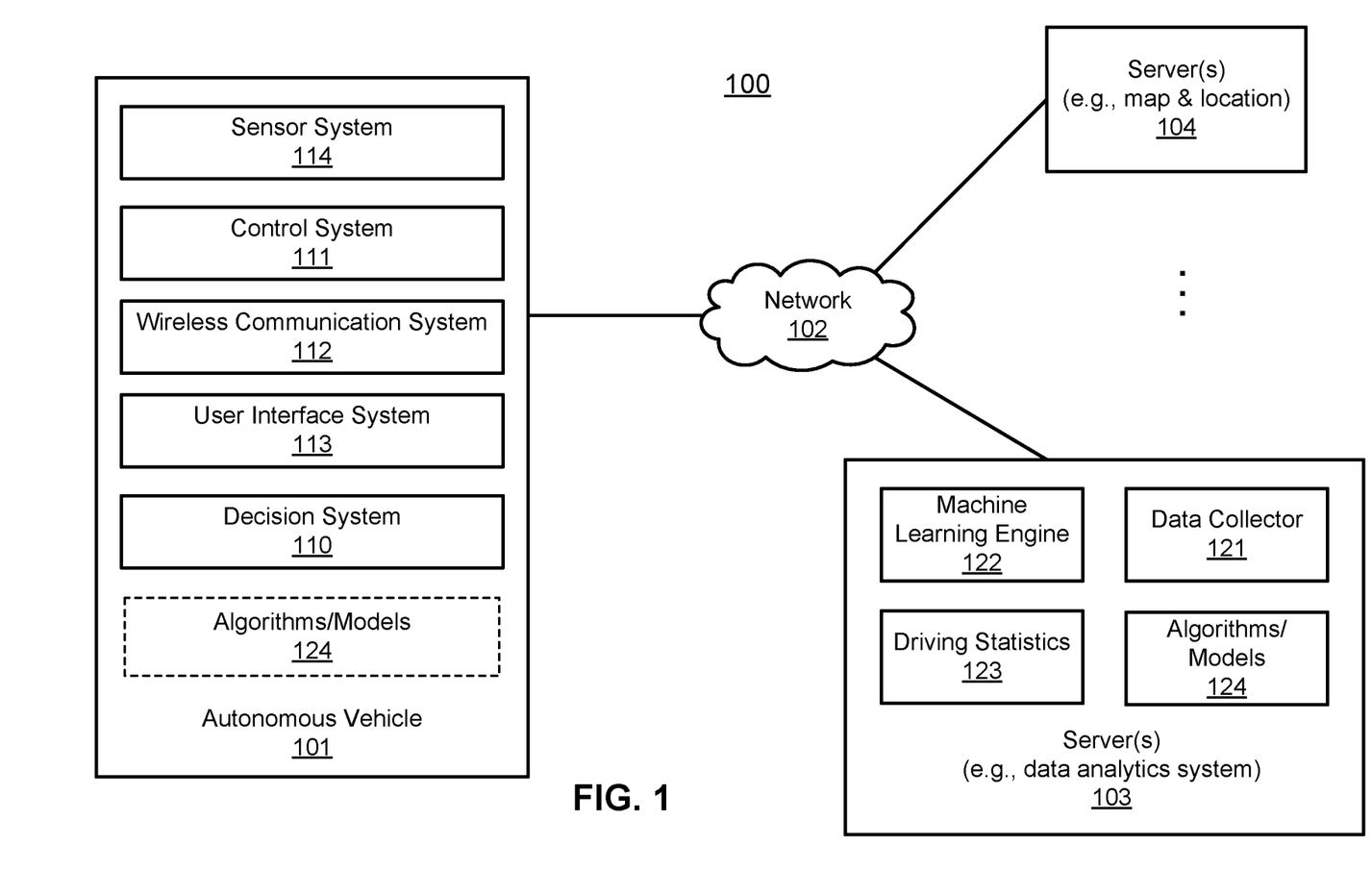
FIG. 1 is a block diagram illustrating an autonomous vehicle network configuration according to one embodiment of the disclosure

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102.

An autonomous vehicle (or vehicle) refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 may include a decision system 110, vehicle control system 111, wireless communication system 112, user interface system 113, and sensor system 114. Autonomous vehicle 101 may further include certain common components included in ordinary vehicles, such as, an engine, wheels, steering wheel, transmission, etc., which may be controlled by vehicle control system 111 and/or decision system 110 using a variety of communication signals and/or commands, such as, for example, acceleration signals or commands, deceleration signals or commands, steering signals or commands, braking signals or commands, etc.

Components 110-114 may be communicatively coupled to each other via an interconnect, a bus, a network, or a combination thereof. For example, components 110-114 may be communicatively coupled to each other via a controller area network (CAN) bus. A CAN bus is a vehicle bus standard designed to allow microcontrollers and devices to communicate with each other in applications without a host computer. For example, it may include a message-based protocol, designed originally for multiplex electrical wiring within automobiles, but is also used in many other contexts.

Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 may generate or train a set of rules, algorithms, and/or predictive models 124 for a variety of purposes. As further described herein, the models 124 may be used for driving control decisions. In addition, as shown, the machine learning engine 122 and models 124 may reside on a server, or at least partially within components of the autonomous vehicle 101. For example, the autonomous vehicle 101 may send data to a server 103 that trains one or more models 124, and may also include an engine 122 and/or models 124 locally for processing driving decisions. In addition, it is contemplated that information may be retrieved from the server 103 when invoking a model 124 residing on the vehicle. For example, immediate processing may occur using a local model 124, which may also retrieve information from a remote model 124 (e.g. from a server 103) that supplements the decision processing.

Figure 2:
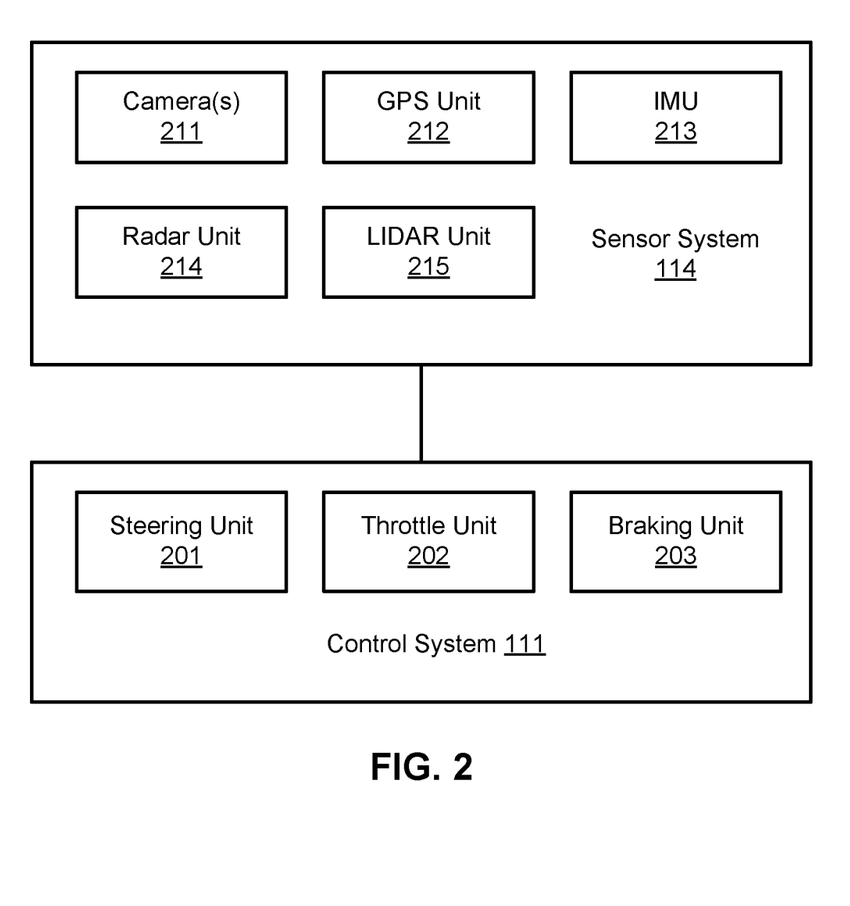
FIG. 2 is a block diagram illustrating a sensor and control system according to one embodiment of the disclosure.

Referring now to FIG. 2, in one embodiment, sensor system 114 may include one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 114 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 may include steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by decision system 110, especially when operating in an autonomous driving mode. Decision system 110 includes the necessary hardware (e.g., processor(s), memory, storage) and software (e.g., operating system, planning and routing programs) to receive information from sensor system 114, control system 111, wireless communication system 112, and/or user interface system 113, process the received information, plan a route or path from a starting point to a destination point, and then drive vehicle 101 based on the planning and control information. Alternatively, decision system 110 may be integrated with vehicle control system 111.

While autonomous vehicle 101 is moving along the route, decision system 110 may also obtain real-time traffic information from a traffic information system or server (TIS). Note that servers 103-104 may be operated by a third party entity. Alternatively, the functionalities of servers 103-104 may be integrated with decision system 110. Based on the real-time traffic information, MPOI information, and location information, as well as real-time local environment data detected or sensed by sensor system 114 (e.g., obstacles, objects, nearby vehicles), decision system 110 can plan an optimal route and drive vehicle 101, for example, via control system 111, according to the planned route to reach the specified destination safely and efficiently. As further described herein, the decision system 110 may update the planned route in response to recognizing a driving obstruction.

Figure 3:
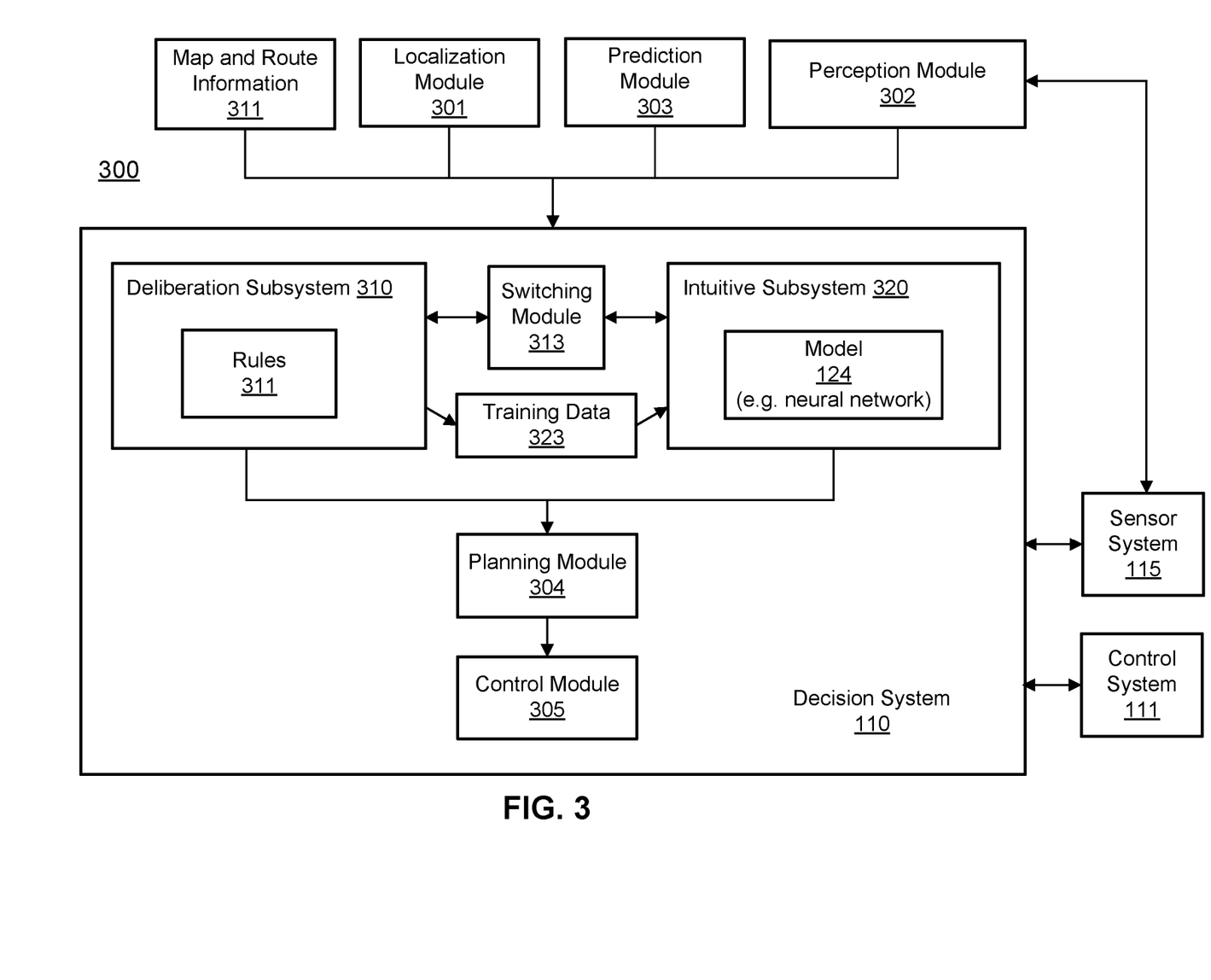
FIG. 3 is a block diagram illustrating an example system used for driving decision control of an autonomous vehicle according to one embodiment of the disclosure.

FIG. 3 is a block diagram illustrating an example system used with an autonomous vehicle according to one embodiment of the disclosure. System 300 may be implemented as a part of autonomous vehicle 101, or part of system 100, of FIG. 1. Referring to the embodiment of FIG. 3, system 300 includes, but is not limited to, localization/traffic module 301, map and route information 311, prediction module 303, perception module 302, and decision system 110.

Localization/traffic module 301 may manage any data related to a trip or route of a user. A user may log in and specify a starting location and a destination of a trip, for example, via a user interface. Localization/traffic module 301 may communicate with other components of autonomous vehicle 101, such as map and route information 311, to obtain the trip related data. For example, localization/traffic module 301 may obtain location and route information from a location server and a map and POI (MPOI) server. A location server provides location services and an MPOI server provides map services and the POIs of certain locations, which may be cached as part of map and route information 311. While autonomous vehicle 101 is moving along the route, localization/traffic module 301 may also obtain real-time traffic information from a traffic information system or server. As further described, this real-time traffic information may be used when determining a course of action (e.g. detour) to undertake in response to a driving obstruction.

Prediction module 303 may provide a framework, tools, or model for the decision system 110 to predict various driving condition or events. Based on the sensor data provided by sensor system 114 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

The map and route information 311, the localization/traffic module 301, prediction module 303, and perception module 302, may provide data utilized by the decision system 110. In one embodiment, the decision system 110 may include a deliberation subsystem 310 and an intuitive subsystem 320. As further described herein, the deliberation subsystem 310 may be invoked in complex driving situations and may rely on a set of rules. Accordingly, the deliberation subsystem 310 may require more computational resources. As further described herein, the intuitive subsystem 320 may be invoked in less complex or a learning stage (e.g. unfamiliar) environment. The intuitive subsystem 320 may rely on a machine-learning model for driving decisions, and accordingly, the model may adapt and learn.

In general, however, decision system 110 (and decision systems 310/320) makes decisions regarding how to handle the object identified by the perception module. For example, for a particular object (e.g., another vehicle in a crossing route) as well as its metadata describing the object (e.g., a speed, direction, turning angle), decision system 110 decide how to encounter the object (e.g., overtake, yield, stop, pass). Decision system 110 may make such decisions according to a set of rules such as traffic rules, which may be stored in persistent storage device.

Based on a decision for each of the objects perceived, planning module 304 plans a path or route for the autonomous vehicle, as well as driving parameters (e.g., distance, speed, and/or turning angle). For example, when the decision system 310 is in operation (e.g. normal or default operating mode), decision system 110 decides what to do with the object, while planning module 304 determines how to do it. For example, for a given object, decision system 320 may decide to pass the object, while planning module 304 may determine whether to pass on the left side or right side of the object. Planning and control data may be generated by planning module 304 including information describing how vehicle 101 would move in a next moving cycle (e.g., next route/path segment). For example, the planning and control data may instruct vehicle 101 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

The decision system 110 (and decision system 310/32) may operate under a general a framework to adhere to traffic rules, route rules, ride comfort rules, etc. For instance, traffic rules may provide the decision system 110 with guidance on particular traffic rules in particular jurisdictions (e.g. right on red), or particular rules with respect to pedestrians or cyclists. Route rules may relate to providing guidance on particular preferences for routes (e.g. avoid tolls, etc.) and other rules related to navigation. Ride comfort rules, for example, maybe user specified. For example, ride comfort rules may include preferences for speed, gas mileage, terrain, etc.

As described, the decision system 110 may utilize subsystems for providing driving decisions including a deliberation subsystem 310 and an intuitive subsystem 320. The deliberation subsystem 310 may include a framework for determining complete driving decisions. In one embodiment, the deliberation subsystem 310 may be used for more complex driving decisions. The deliberation subsystem 310 may utilize a rule-based approach to determine driving decisions. Accordingly, the subsystem may use a set of rules 311. In one embodiment, the rules 311 may be static (although updatable, e.g. via a software update), and thus, output decisions may not change or improve dynamically under the same input conditions as with a learning model. In some implementations, due to the complexity of processing various rules, the deliberation subsystem 310 may be more resource intensive.

The intuitive subsystem 320 may also include a framework for determining complete driving decisions. The intuitive subsystem 320 may utilize a model-based approach to determine driving decisions. The model 124 may be of any suitable type of learning model that may implement any suitable learning techniques such as supervised, unsupervised, hybrid, active learning etc. In one embodiment, the model 124 may include a deep neural network model. The model 124 may reside on the vehicle, on a server, or on both. For example, the model 124 may reside on the vehicle (e.g. storage), but may work in conjunction with a model 124 on a server (e.g. via a wireless connection).

A switching module 313 (or decision system 110) may receive one or more types of data from the map and route information 311, the localization/traffic module 301, prediction module 303, and perception module 302. Based on the one or more types of data received, the switching module 313 may perform an analysis to determine which subsystem (deliberation or intuitive) to invoke. The analysis may determine various factors that may be weighted. The switching module 313 may perform the analysis to determine a set of driving or environment conditions. A driving condition may include the complexity of the driving environment. For example, driving on an empty two lane highway with minimal traffic may be considered less complex than a congested intersection with various types of vehicles and pedestrian traffic. Another condition may include whether the environment is familiar to the system. For example, navigating a regular route may be more familiar, and thus, more predictable than navigating backroads that may have minimal map and traffic data.

Accordingly, the deliberation subsystem 310 may be invoked when driving within a particular type of environment such as a complex driving environment, or unfamiliar or new environments. The intuitive subsystem 320 may also be invoked based on the determined set of driving or environment conditions. For example, the intuitive subsystem 320 may be invoked in less complex driving conditions, or when driving within a particular type of environment such as a familiar or known environment. When determining whether to switch between subsystems, the switching module 313 may consider various thresholds. For example, a complexity threshold may determine the number of objects surrounding the vehicle and based on the number of objects determine whether to switch between subsystems. For instance, if the vehicle enters a traffic intersection from a highway, the complexity threshold may be met and the switching module 313 may switch driving control from the intuitive subsystem 320 to the deliberation subsystem 310. In addition, the switching module 313 may determine whether to switch subsystems based on the availability of rules. For example, if an encountered driving situation does not coincide with a sufficient set of rules 311, the intuition subsystem 320 may be invoked. It should be noted that the subsystems have been labelled as a deliberation and intuitive system for convenience, but it is contemplated that other configurations may be used to switch between a substantially rule-based decision system and a model-based decision system.

As described, one advantage of implementing model-based decision making is the ability for the model to learn. Accordingly, information acquired during the operation of the deliberation subsystem 310 may be collected and sent as training data 323 to the model 124. Accordingly, the model 124 may then periodically be trained based on the training data 323.

It should be noted with respect to FIG. 3, that decision subsystems 310/320 and planning module 304 may be integrated as an integrated module. For example, decision system 110 and planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

In addition, some or all of modules (or systems) shown in FIG. 3 may be implemented in software, hardware, or a combination thereof. For example, these modules may be installed in persistent storage device, loaded into memory, and executed by one or more processors. Note that some or all of these modules may be communicatively coupled to or integrated with some or all modules of vehicle control system 111 of FIG. 2. Some of modules may be integrated together as an integrated module. In addition, such components (e.g. modules and systems) can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
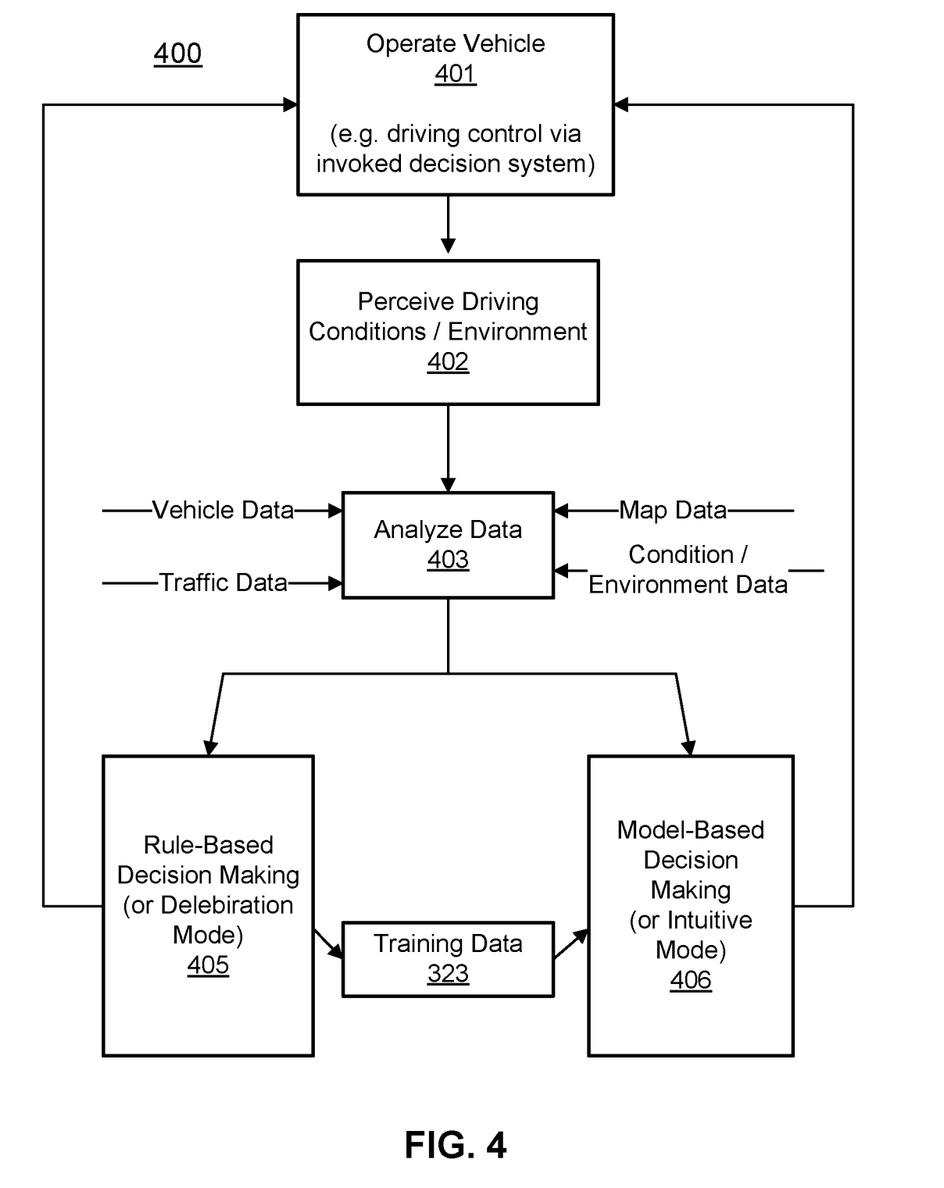
FIG. 4 is an example process flow of invoking rule-based or model-based decision making according to an embodiment of the disclosure.

FIG. 4 is an example process flow diagram of invoking rule-based or model-based decision making according to an embodiment of the disclosure. Diagram 400 shows a process flow of a system (e.g. system 100, 300) providing driving control. The system may operate a vehicle 401 (e.g. autonomously) by implementing an invoked decision system such as a deliberation system 310 (or deliberation mode), which may use rule-based decision making 405, or an intuitive system 320 (or intuitive mode), which may use model-based decision making 406 as described above. During operation, the system may perceive driving conditions and/or an environment surrounding the vehicle 402. For example, the system may output one or more types of perceived data such as vehicle data, traffic data, map data, and driving condition/environment data. The system may then analyze this data 403. When analyzing the data, the system may determine whether one or more factors or criteria are met, and may invoke (or initiate) an appropriate decision making framework. As described above, the system may invoke rule-based decision making 405 (e.g. deliberation mode) in more complex situations, or may invoke model-based decision making 406 (e.g. intuitive mode) in less complex situations, or familiar situations, or when there are not sufficient rules for a particular driving condition. The system may then continue with operation of the vehicle 401 with the invoked decision system and the process may repeat by switching between decision making frameworks as necessary. In addition, information collected during the rule-based decision making may be used as training data 323 for the model used in the model-based decision making.

Figure 5:
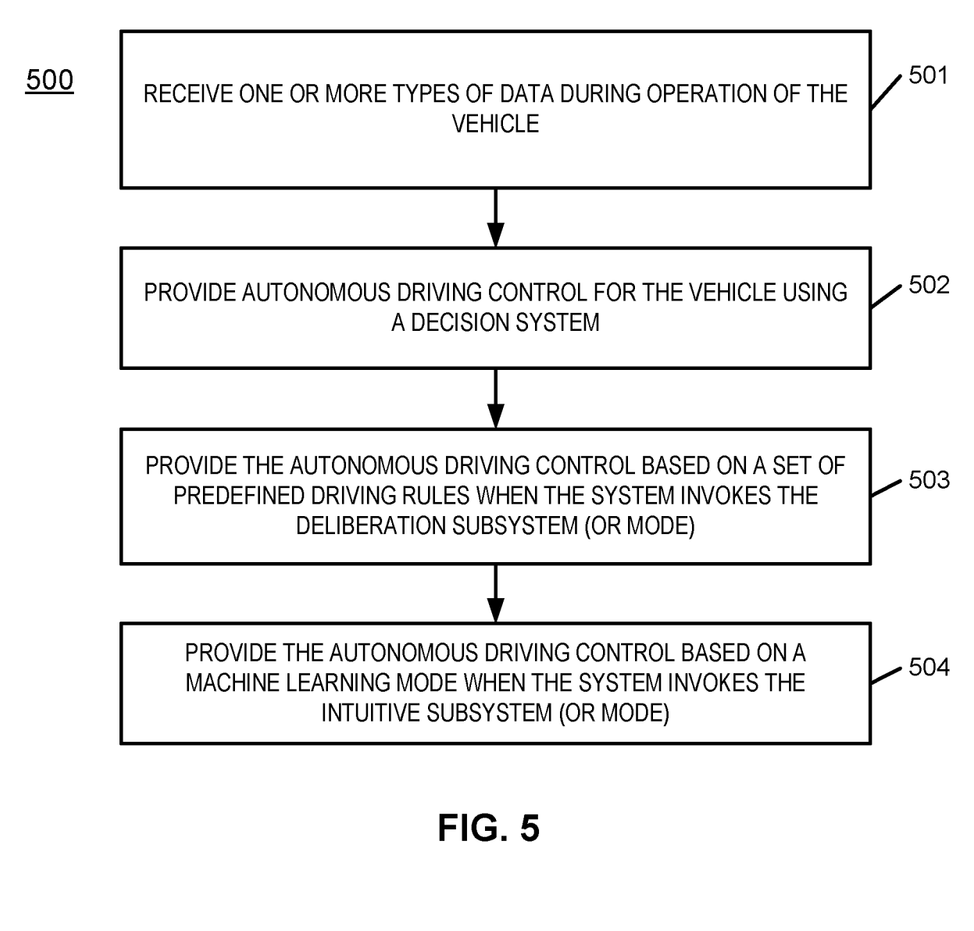
FIG. 5 is an example flow diagram illustrating a method of invoking a driving decision framework according to an embodiment of the disclosure.

FIG. 5 is an example flow diagram illustrating a method of invoking a driving decision subsystem according to an embodiment of the disclosure. Process 500 may use processing logic which may include software, hardware, or a combination thereof. For example, process 500 may be performed by a system (e.g. systems 100 or 300), or a computing device or device.

In 501, the system may receive one or more types of data during operation of the vehicle. The one or more types of data may include at least perception data of a driving environment surrounding the vehicle. The one or more types of data may also include location information of the vehicle, or map or real-time traffic information.

In 502, the system may provide autonomous driving control for the vehicle using a decision system. The decision system may switch between a deliberation subsystem and an intuitive subsystem based on an analysis of the one or more types of data. The analysis of the one or more types of data may include determining whether a familiarity threshold of the driving environment is satisfied. If the familiarity threshold is satisfied the decision system may invoke the intuitive subsystem, and if the familiarity threshold is not satisfied the decision system may invoke the deliberation subsystem.

In addition, the analysis of the one or more types of data may include determining whether a complexity threshold of the driving environment is satisfied. If the complexity threshold is satisfied the decision system may invoke the deliberation subsystem. If the familiarity threshold is not satisfied the decision system may invoke the intuitive subsystem.

In 503, when the system invokes the deliberation subsystem, the decision system provides the autonomous driving control based on a set of predefined driving rules.

In 504, when the system invokes the intuitive subsystem, the decision system provides the autonomous driving control based on a machine-learning model.

In one embodiment, when the deliberation subsystem is invoked, a set of outputs from the deliberation model are provided to the machine-learning model as training data.

Figure 6:
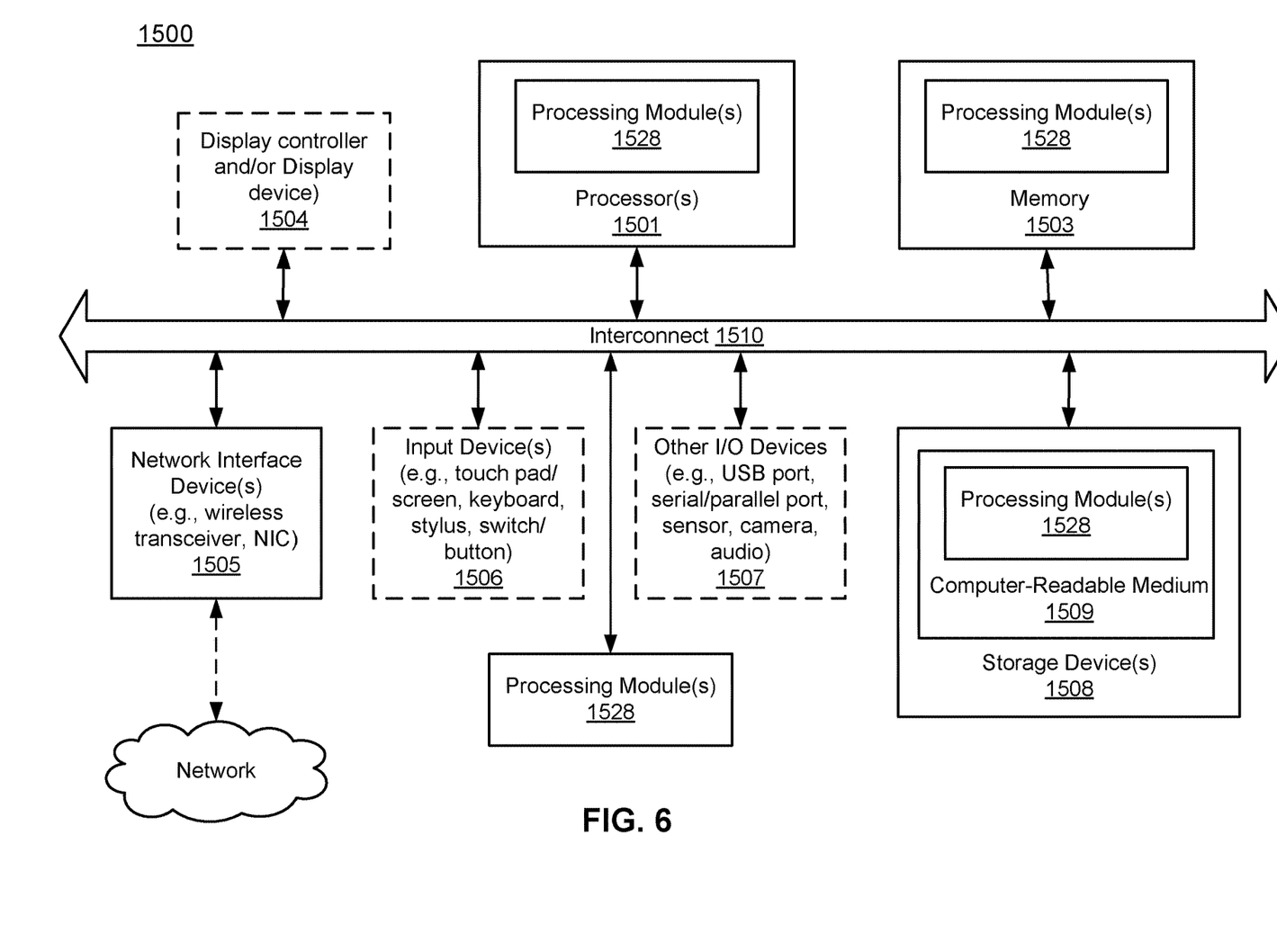
FIG. 6 is a block diagram illustrating an example computing system used in conjunction with one or more embodiments of the disclosure.

FIG. 6 is a block diagram illustrating an example computing system used in conjunction with one or more embodiments of the disclosure.

For example, system 1500 may represent any of data processing systems described above performing any of the processes or methods described above, such as, for example, one or more components 110-114 of the autonomous vehicle 101, or servers 103-104 described above. System 1500 can include many different components. In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501 may be configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include various electronic displays (e.g., a monitor having a screen, a small LCD touch-screen or any other electrical device that is operable to display information), audio output (such as speakers). For example, vehicle 101 may include an internal electronic display. In this regard, internal electronic display may be located within a cabin of vehicle. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

Storage device 1508 may include computer-accessible storage medium 1509 (also known as a machine-readable storage medium or a computer-readable medium) on which is stored one or more sets of instructions or software (e.g., component, module, unit, and/or logic 1528) embodying any one or more of the methodologies or functions described herein.

Component/module/unit/logic (e.g. processing modules) 1528 may represent any of the components described above, such as, for example, decision system 110, sensor system 114, and control system 111 (and related modules and sub-modules). Component/module/unit/logic 1528 may also reside, completely or at least partially, within memory 1503 and/or within processor 1501 during execution thereof by data processing system 1500, memory 1503 and processor 1501 also constituting machine-accessible storage media. In addition, component/module/unit/logic 1528 can be implemented as firmware or functional circuitry within hardware devices. Further, component/module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; and phase-change memory).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for providing autonomous driving control for a vehicle, comprising:

receiving one or more types of data during operation of the vehicle, wherein the one or more types of data include at least perception data of a driving environment surrounding the vehicle; and providing autonomous driving control, by the vehicle, wherein the driving control switches between a deliberation mode and an intuitive mode based on an analysis of the one or more types of data, wherein the deliberation mode provides the autonomous driving control based on a set of predefined driving rules, and the intuitive mode provides the autonomous driving control based on a machine-learning model, and wherein the autonomous driving control includes a selected route for the vehicle as well as one or more driving parameters, wherein output from the deliberation mode is provided to the machine-learning model in the intuitive mode as training data, including controlling the vehicle in the intuitive mode based on the machine-learning model including a deep neural network (DNN) as a default mode to reduce computational resources, and switching from the intuitive mode based on the machine-learning model including the DNN to the deliberation mode based on the set of predefined driving rules including traffic rules, route rules, and ride comfort rules, in response to the analysis of the one or more types of data determining a complexity threshold of the driving environment is met, wherein the complexity threshold is determined based on the number of perceived vehicle or pedestrian objects within the driving environment surrounding the vehicle.

2. The method of claim 1, wherein the driving control switches to the intuitive mode in response to the analysis of the one or more types of data determining a familiarity threshold of the driving environment is satisfied.

3. The method of claim 1, wherein the one or more types of data further include map and real-time traffic information, and location information of the vehicle.

4. The method of claim 1, wherein the one or more types of data further include location information of the vehicle.

5. A non-transitory machine-readable medium having instructions stored therein, which when executed by a processor, cause the processor to perform operations for providing autonomous driving control for a vehicle, the operations comprising:

receiving one or more types of data during operation of the vehicle, wherein the one or more types of data include at least perception data of a driving environment surrounding the vehicle; and providing autonomous driving control, by the vehicle, wherein the driving control switches between rule-based decision making and model-based decision making based on an analysis of the one or more types of data, wherein when the rule-based decision making is invoked, the autonomous driving control is based on a set of predefined driving rules, and when the model-based decision making is invoked, the autonomous driving control is based on a machine-learning model, and wherein the autonomous driving control includes a selected route for the vehicle as well as one or more driving parameters, wherein output from the deliberation mode is provided to the machine-learning model in the intuitive mode as training data, including controlling the vehicle in the intuitive mode based on the machine-learning model including a deep neural network (DNN) as a default mode to reduce computational resources, and switching from the intuitive mode based on the machine-learning model including the DNN to the deliberation mode based on the set of predefined driving rules including traffic rules, route rules, and ride comfort rules, in response to the analysis of the one or more types of data determining a complexity threshold of the driving environment is met, wherein the complexity threshold is determined based on the number of perceived vehicle or pedestrian objects within the driving environment surrounding the vehicle.

6. The medium of claim 5, wherein the analysis of the one or more types of data includes determining a familiarity threshold of the driving environment.

7. The medium of claim 5, wherein the one or more types of data further include map and real-time traffic information.

8. The medium of claim 5, wherein the one or more types of data further include location information of the vehicle.

9. A data processing system for providing autonomous driving control for a vehicle, comprising:

a processor; and a memory coupled to the processor to store instructions, which when executed by the processor, cause the processor to perform operations, the operations including receiving one or more types of data during operation of the vehicle, wherein the one or more types of data include at least perception data of a driving environment surrounding the vehicle; and providing autonomous driving control, by the vehicle, using a decision system, wherein the decision system switches between a deliberation subsystem and an intuitive subsystem based on an analysis of the one or more types of data, wherein the deliberation subsystem provides the autonomous driving control based on a set of predefined driving rules, and the intuitive subsystem provides the autonomous driving control based on a machine-learning model, and wherein the autonomous driving control includes a selected route for the vehicle as well as one or more driving parameters, wherein output from the deliberation mode is provided to the machine-learning model in the intuitive mode as training data, including controlling the vehicle in the intuitive mode based on the machine-learning model including a deep neural network (DNN) as a default mode to reduce computational resources, and switching from the intuitive mode based on the machine-learning model including the DNN to the deliberation mode based on the set of predefined driving rules including traffic rules, route rules, and ride comfort rules, in response to the analysis of the one or more types of data determining a complexity threshold of the driving environment is met, wherein the complexity threshold is determined based on the number of perceived vehicle or pedestrian objects within the driving environment surrounding the vehicle.

10. The system of claim 9, wherein the decision system switches to the intuitive subsystem in response to the analysis of the one or more types of data determining a familiarity threshold of the driving environment is satisfied.

11. The system of claim 9, wherein the one or more types of data further include map, real-time traffic information, and location information of the vehicle.

* * * * *